United States Patent
Niro et al.

(10) Patent No.: US 9,927,265 B2
(45) Date of Patent: Mar. 27, 2018

(54) MACHINE DIAGNOSTIC ENCODER

(71) Applicant: NIDEC AVTRON AUTOMATION CORPORATION, Independence, OH (US)

(72) Inventors: William P. Niro, Independence, OH (US); Brian Winter, Independence, OH (US)

(73) Assignee: Nidec Avtron Automation Corporation, Independence, OH (US)

( * ) Notice: Subject to any disclaimer, the term of this patent is extended or adjusted under 35 U.S.C. 154(b) by 641 days.

(21) Appl. No.: 14/520,933

(22) Filed: Oct. 22, 2014

(65) Prior Publication Data
US 2015/0112640 A1  Apr. 23, 2015

Related U.S. Application Data

(60) Provisional application No. 61/894,177, filed on Oct. 22, 2013.

(51) Int. Cl.
*G01D 15/00* (2006.01)
*G01M 99/00* (2011.01)
(Continued)

(52) U.S. Cl.
CPC ............. *G01D 15/00* (2013.01); *G01D 5/00* (2013.01); *G01M 99/005* (2013.01);
(Continued)

(58) Field of Classification Search
CPC ...... G01D 15/00; G01D 5/00; G05B 23/0205; G05B 2219/31211; G05B 23/0221; G05B 23/0235; G05B 23/027; G01M 99/005
See application file for complete search history.

(56) References Cited

U.S. PATENT DOCUMENTS 6,434,512 B1 * 8/2002 Discenzo ............... F16C 19/52
                                                         702/184
2007/0250246 A1 * 10/2007 Balasu .................. B60T 17/221
                                                         701/101
(Continued)

FOREIGN PATENT DOCUMENTS

GB        1217961 A      1/1971
WO   WO 2007/021425 A1  2/2007

OTHER PUBLICATIONS

Smith, The Scientist and Engineer's Guide to Digital Signal Processing, 2011, p. 1-3.*
(Continued)

*Primary Examiner* — John Breene
*Assistant Examiner* — Mohammad Islam
(74) *Attorney, Agent, or Firm* — Tarolli, Sundheim, Covell & Tummino LLP (57) ABSTRACT

A system includes an encoder to monitor a machine and generate an encoder output signal indicative of at least one of the motion or position of the machine. A combiner can be configured to receive the encoder output signal from the encoder and to receive machine diagnostic data from at least one other sensor. The combiner can combine the machine diagnostic data with the encoder output signal to provide a combined signal that includes the machine diagnostic data synchronized with the at least one of the motion or position of the machine. An output stage can provide the combined signal to a remote system.

19 Claims, 6 Drawing Sheets

(51) Int. Cl.
  *G01D 5/00* (2006.01)
  *G05B 23/02* (2006.01)

(52) U.S. Cl.
  CPC ........ *G05B 23/0205* (2013.01); *G05B 23/027* (2013.01); *G05B 23/0221* (2013.01); *G05B 23/0235* (2013.01); *G05B 2219/31211* (2013.01)

(56) References Cited

U.S. PATENT DOCUMENTS

| | | | |
|---|---|---|---|
| 2008/0114852 A1 | 5/2008 | Claus et al. | |
| 2008/0284575 A1* | 11/2008 | Breed | B60C 23/0493 340/438 |
| 2009/0059947 A1 | 3/2009 | Barthel et al. | |
| 2010/0173628 A1* | 7/2010 | Hosain | H04W 48/18 455/432.1 |
| 2011/0098968 A1* | 4/2011 | Srinivasa | G01H 1/003 702/145 |
| 2013/0240719 A1* | 9/2013 | Sato | G01D 5/34 250/231.14 |
| 2014/0140426 A1* | 5/2014 | Dinur | H04B 7/0689 375/267 |

OTHER PUBLICATIONS

PCT International Application No. PCT/US2014/061765; International Search Report, Applicant: Nidic Avtron Automation Corporation, Authorized Officer, Eddy Bernard, Date of Actual Completion: Jan. 26, 2015, 4 pp.

PCT International Application No. PCT/US2014/061765; Written Opinion of the International Searching Authority, Applicant: Nidic Avtron Automation Corporation, Authorized Officer, Eddy Bernard, Date of Actual Completion: Jan. 26, 2015, 6 pp.

\* cited by examiner

MACHINE DIAGNOSTIC ENCODER

CROSS-REFERENCE TO RELATED APPLICATION

This application claims the benefit of U.S. Provisional Patent Application 61/894,177, filed on Oct. 22, 2013, and entitled MACHINE DIAGNOSTIC ENCODER, the entirety of which is incorporated by reference herein.

TECHNICAL FIELD

This disclosure relates to encoders and method of encoding that can process and transmit diagnostic information for a machine.

BACKGROUND

Large manufacturing operations, such as paper or steel production, routinely employ very large machines, including motors or generators. Such machines are typically controlled from a remote system that can be located at large distances from the machines. As an example, to control the machines, encoders are often mounted on or coupled to the shaft of the machine to detect machine position and/or speed. In certain environments, communicating the encoder position signals back to the controller and likewise sending drive commands from the controller to the machine can be an expensive process due to the long distances between controller and machine. In such environments, there may be significant electrical interference such that wireless transmission is not a viable option.

SUMMARY

This disclosure relates to encoders and method of encoding that can process and transmit diagnostic information for a machine.

In one example, a system includes an encoder to monitor a machine and generate an encoder output signal indicative of at least one of motion or position of the machine. A combiner receives the encoder output signal from the encoder and machine diagnostic data based on sensor data from at least one sensor. The combiner combines the machine diagnostic data with the encoder output signal to provide a combined signal that includes the machine diagnostic data synchronized with the at least one of the motion or position of the machine.

In another example, a method can include generating an encoder output signal for a machine indicative of at least one of the motion or position of the machine. The method can also include monitoring the machine via one or more sensor signals and generating machine diagnostic data representing a characteristic of the machine. The method can also include combining the encoder output signal with the machine diagnostic data to provide a combined signal in which the machine diagnostic data is synchronized with at least one of the motion or the position of the machine As yet another example, an encoder apparatus can include an encoder to generate an encoder output signal indicative of at least one of the motion or position of a rotary motor. A preprocessor can analyze at least one sensor signal indicative of a condition of the rotary motor and to provide motor diagnostic data based on the analysis. A combiner combines the motor diagnostic data with the encoder output signal to provide a combined signal in which the motor diagnostic data is synchronized with the at least one of the motion or position of the rotary motor indicated by the encoder output signal. A communications stage provides the combined signal to a remote system.

DETAILED DESCRIPTION

System and methods are disclosed to enable collection, analysis, and transmission of diagnostic information for a machine, such as a motor or generator. The diagnostic information can be provided based on a signal from one or more sensors configured to measure a condition of the machine or machine operating parameter (e.g., temperature, vibration, moisture, etc.). In one example, an encoder apparatus can convert machine position to an encoder signal representing position and/or speed of the associated machine (e.g., motor, generator). For example, the encoder apparatus can be an incremental encoder. The encoder apparatus can also include preprocessing configured to perform some signal processing or computations on machine sensor information and provide the diagnostic information. The preprocessing can be performed locally where the encoder is installed at the machine and/or remotely at a system (e.g., controller, computer) that processes the encoder position and diagnostic data. Rather than transmit the diagnostic information over separate wires which would add to system cost, the encoder apparatus can transmit the diagnostic information for the machine to a remote system by combining encoder data with the diagnostic information from the machine using existing wiring for the encoder data.

Additionally, the diagnostic information from the machine can be synchronized with machine position such as via predetermined points on the encoder (e.g., synchronized with the reference mark of the encoder or some position relative the reference mark). Machine diagnostic information can also be synchronized with other motor parameters such as motor speed, for example. By synchronizing diagnostic information with encoder position and/or speed, more detailed analysis and troubleshooting can be implemented based on the synchronized diagnostic information. For example, if machine vibration is sensed (e.g., via one or more accelerometers) and synchronized by the encoder with position and/or speed information, the preprocessing (as well as subsequent post processing) can determine if vibration exceeds a predetermined threshold such that the motor position and/or speed at which the vibration anomaly occurs can easily be determined.

In some examples, the preprocessing can detect a motor condition, which can result in dynamically controlling (e.g., adjusting) machine diagnostic sensing or sampling of sensors for generating the machine diagnostic information. As disclosed herein, other types of machine diagnostic information can be synchronized with the encoder position and/or speed signals and sent as a combined signal to the remote system. The machines being monitored can be significantly large (e.g., over 1000 horse power motors) and expensive, such that the machine diagnostics implemented according to the systems and methods can help protect significant capital investment.

Figure 1:
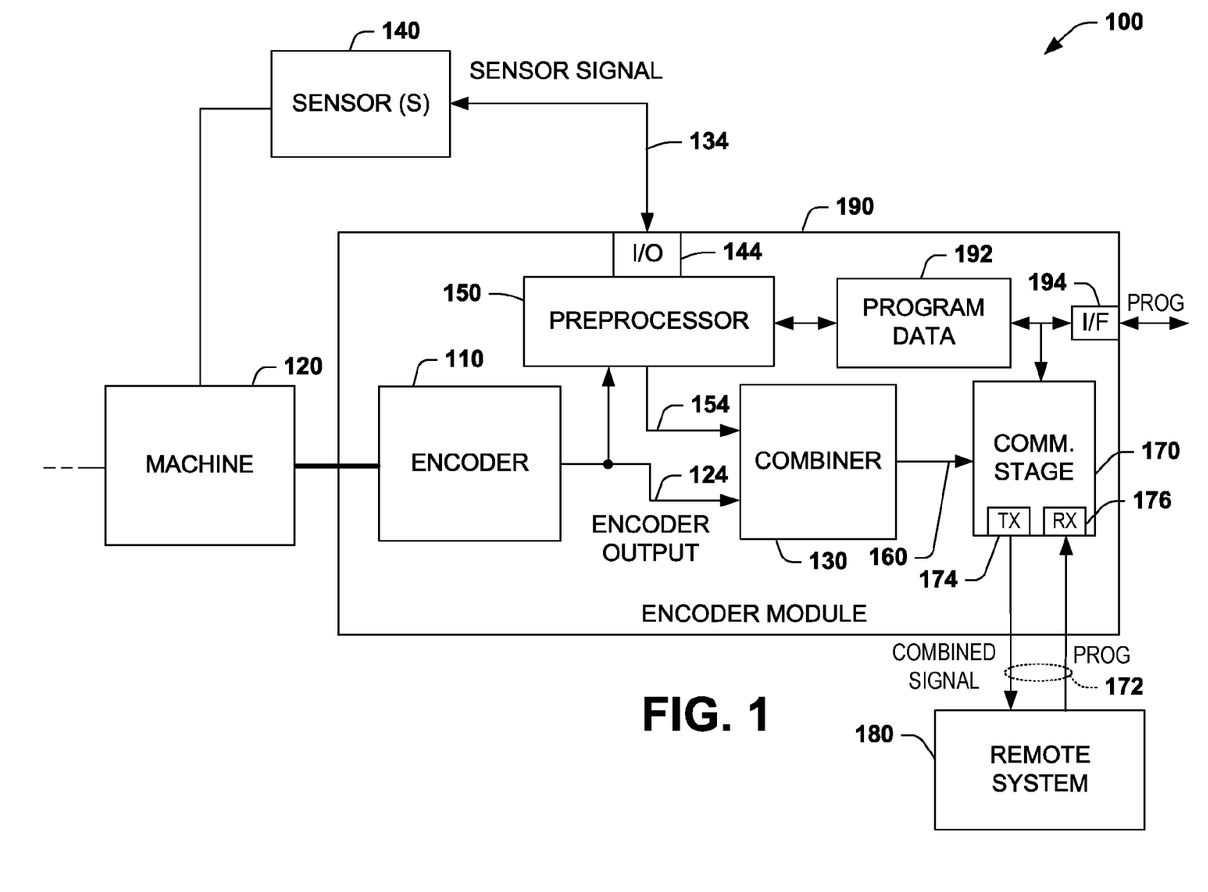
FIG. 1 illustrates an example of a system to combine machine diagnostic data with encoder data.

FIG. 1 illustrates an example of a system 100 configured to combine machine diagnostic data with encoder data, such that the machine diagnostic data is synchronized with motion and/or position of the machine. As used herein, machine diagnostic data can encompass any information about the health or other diagnostic condition of the machine. Examples of such health or diagnostic condition can include one or more of the following: machine vibration, temperature (e.g., bearing temperature, winding temperature, temperature of machine coolant), moisture, electrical conditions (e.g., voltage and/or current), torque or strain. Each of such sensed conditions can be provided as an analog or digital signal from one or more sensors 140. The type of sensors thus can vary depending on application requirements and the type of machine and which one or more machine health or diagnostic conditions are being sensed. In the examples disclosed herein, the machine 120 is typically described as a rotary motor or a generator, but other machines are possible such as a linear motor or slide, where the machine drives the slide and the encoder 110 monitors movement of the slide. Thus, also in machine 120, machine diagnostic information can be taken directly from a mechanical mounting shaft or coupling to machine shaft to provide similar information. One example would be 3-dimensional vibration and audio input synchronized to rotational position to monitor a machine from a non-motor-driven shaft.

The system 100 includes an encoder 110 to monitor a machine 120 and to generate an encoder output signal 124 that indicates the motion and/or position of the machine. The encoder 110 can be an incremental encoder (e.g., also known as tachometer or rotary pulse generator). For example, the encoder includes a rotatable member that can be connected coaxially with a rotating motor shaft of the machine. The encoder 110 can provide an encoder output that is proportional to shaft position (pulse count) or shaft speed (pulse rate) or it may provide both position and speed information. For example, the encoder can generate typical encoder quadrature pulses (e.g., A, /A, B, /B, marker, /marker) to track position and speed of the machine 120. The encoder 110 be configured using a variety of sensing technologies such as optical (e.g., detecting light via one or more photodiodes), magnetic (e.g., detecting magnetic elements via Hall-effect or magnetoresistive sensors), conductive technologies or the like.

A combiner 130 is configured to receive the encoder output signal 124 from the encoder(s) 110 and to receive pre-processed diagnostic data 154. For example, at least one other sensor 140 is configured to monitor a condition of the machine (e.g., characterizing a state of health and/or diagnostic condition for the machine 120) and provide a corresponding sensor signal 134, which can be an analog or digital signal. The sensor signal 134 can be received at an input/output (I/O) port 144 from one or more external machine diagnostic sensors 140. The I/O port 144 can include any number and type of port for connecting to respective sensors 140. For example, the port can provide a serial electrical input to receive electrical sensor data. As another example, the input port can provide a local wireless interface to receive sensor signals, such as a local Bluetooth or other short range communications protocol. For instance, the sensor 140 can include a current transformer (CT) sensor to measure current through one or more windings of the motor. The CT sensor can provide sensed current signal (e.g., an analog or digital signal) to the I/O port via wired or wireless communications. In some examples, the sensor 140 (e.g., a CT sensor) can be self-powered based on the induced voltage or current generated from the electrical signal flowing through a conductor to which the sensor is attached.

The sensor 140 (or sensors) can be installed in various locations and can include substantially any type of analog and/or digital sensors. In some examples the sensor can be mounted at various points on (or near) the machine 120 with each sensor output providing diagnostic sensor data 134 to the I/O port 144 (or ports). The sensor 140 can be substantially any type of sensor including: thermocouples, accelerometers, vibration sensors, pressure sensors, current sensors, voltage sensors, torque sensors, strain gauges, bearing and stator sensors, and so forth. The sensor 140 can also include digital sensors such as over-speed sensors, blower sensors, filtration sensors, coolant flow pressure and/or temperature sensors, switch sensors (e.g., temperature switches, airflow sensor switches, etc.), and so forth, which can vary depending on the purpose and application of the machine 120. In yet another example, the sensor 140 can be mounted within in or near the encoder 110. In some cases, the housing of the encoder module 190 or coupling between the encoder and the machine can function as a transducer for monitoring properties of the machine 120 (e.g., monitor the encoder housing for temperature or vibration of the motor). In such cases, sensor output from the encoder 110 could be routed to the preprocessor 150 or sent directly to the combiner 130 to be combined with the encoder output data 124.

While the example of FIG. 1 demonstrates the sensors 140 as located external to the encoder module 190 that houses the encoder 110 and associated electrical circuitry/components, additionally or alternatively, one or more such sensors can be implemented within or on the module 190 to monitor machine health and/or diagnostic information. In such alternative example, the preprocessor 150 can receive corresponding sensor signals via an internal bus, such as from the machine diagnostic sensor residing within the encoder apparatus itself.

The encoder module 190 can include a preprocessor 150 configured to perform analysis on the diagnostic sensor data 134 before providing processed diagnostic data 154 to the combiner 130. The preprocessor 150 can be a microprocessor or microcontroller that also controls the components of the encoder apparatus. As disclosed herein, the preprocessing performed by the preprocessor 150 can be programmed based on program data 192, which can depend on the type of signal (e.g., analog or digital) as well as the type or configuration of components or the condition of the machine 120 that is sensed. For example, the program data 192 can specify a particular type of preprocessing to be performed by the preprocessor 150 based on the type of sensors 140, and the preprocessor 150 thus can be programmed to convert the sensed signal to a different form, such as by filtering, fast Fourier transform, sampling, quantization and the like. This preprocessing may facilitate combining the preprocessed sensed signal with position or rotation data, or it may reduce the effective bandwidth required to transmit the diagnostics data. Additionally or alternatively, the program data 192 can specify physical and operating characteristics (e.g., number and type of bearings, expected loads, operating frequencies and the like) for the machine. Moreover, the program data can specify the type of encoder 110 and the output specification of the encoder output 124. Based on the program data 192, the preprocessor 150 can thus analyze the signals by performing comparisons, applying mathematical operators, statistical analysis and/or logical operators on the data acquired by one or more of the sensors 140.

As an example, the preprocessing can compare the sensed signal or a processed version thereof with one or more other predetermined values, such as can include average values, norms, or other pre-stored characteristics. For instance, sensed vibration data for machine bearings can be compared relative to bearing vibration profiles (e.g., determined normal operating parameters for such machine) or to previously recorded conditions considered normal operation for the particular machine. This "prerecording" of normative machine conditions can be triggered locally, via operator input, at predetermined or statistically determined time intervals or via remote system 180, for example. As yet a further example, the preprocessor 150 can employ the program data 192 to control operation of the one or more sensors 140, such as by adjusting a sample rate based on other preprocessing.

By way of further example, the preprocessor 150 can perform Fast Fourier Transform (FFT) analysis to analyze signals from the machine 120. This can include monitoring sensor diagnostic sensor data 134 against predetermined thresholds and initiating local alarms (e.g., activating a light at the motor to alert operator) if a threshold is exceeded. For example, if a machine vibration in one or more particular axis of motion were detected above a predetermined vibration threshold and at a warning frequency for the bearing types contained within the machine, the preprocessor 150 could activate an alarm. The detection of this or other condition/event can also be utilized by the preprocessor 150 to further control the measurements being performed by the sensor 140, such as by increasing the sample rate in response. The preprocessor 150 can also utilize position and/or speed measured by the encoder 110 and provided in the encoder output 124 to adjust such control, such as by increasing sample rate for a given sensor 140 according to a position/speed where the condition/event was detected. Thus, additional detailed machine diagnostic information can be acquired relevant to a predetermined threshold or condition for the machine as well as based on the encoder information 124. The preprocessor 150 can also package alarm messages in the processed diagnostic data 154 for further processing and logging at the remote system 180. For example, upon reception of an alarm message, the remote system 180 can alert managers (e.g., via local display/sound alarms or via electronic messaging, such as e-mail). The remote system 180 can also automatically alter operations of the machine 120—including shutdown, depending on the nature of the received alarm/message.

Other processing aspects of the preprocessor 150 can include more elaborate analysis such as operating learning components (e.g., classifiers) that monitor the machine 120 over time via the received diagnostic sensor data 134. Such components can be trained about the normal operations of the machine and generate alarms based off deviations from predicted statistical probabilities for the machine 120.

As a further example, the program data 192 can be stored in memory in the encoder module, such as non-volatile. The preprocessor can also utilize volatile memory that includes instructions for executing diagnostic analysis and synchronization, and for processing of received diagnostic sensor data 134 and monitoring encoder output data 124, such as disclosed herein. The program data can be programmed in response to program instructions PROG. The program instructions PROG can be received via a local interface 194, such as by connecting a computer or other device to the encoder module via an appropriate connector. Additionally or alternatively, the program instructions PROG can be provided from the remote system 180, be received at a receiver 176 of a communications stage 170 and be stored in memory as the program data 192. For instance, the memory can also be remotely preloaded with typical or normal data, for example, including bearing vibration profiles, resonant frequencies, machine inertial characteristics, and the like.

The combiner 130 can be configured to aggregate the processed diagnostic data 154 with the encoder output signal 124 to provide a combined signal 160 that includes the processed diagnostic data synchronized with encoder data that represents at least one of motion and/or position of the machine 120. For example, the combiner 130 can provide the processed diagnostic data as intermediate to high frequency signals modulated onto a relatively low frequency encoder signal. The encoder signal can be provided according to a standard communication protocol (e.g., PROFIBUS, MODBUS, CANopen, Industrial Ethernet, DeviceNet or the like). The combiner 130 can thus provide the combined output signal 160 to include the encoder output signal (packaged according to a desired protocol) which also operates as a carrier signal into which the processed diagnostic data 154 is modulated.

The preprocessor 150 can control which processed diagnostic data (e.g., from one or more sensor) is provided to the combiner 130 for modulation onto the encoder signal. The placement of such processed diagnostic data 154 onto the encoder signal pulses thus can itself provide desired temporal synchronization with corresponding encoder information, namely the motor position and/or speed. For instance, the preprocessing can occur in substantially real time such that the processed diagnostic data is provided substantially concurrently with the machine condition being sensed and is placed by the combiner 130 onto the encoder output signal stream 124 commensurate with the time of measurement. Thus, by determining the position or speed of the motor from the encoder portion of the combined signal, a frame of reference for the machine position/speed corresponding to each sensed machine condition can be provided in the processed diagnostic data.

To provide another example of synchronization, the preprocessor 150 can monitor the encoder output signal (e.g., a series of pulses) 124 time-synchronized with respect to the encoder marker pulse which is generated once per revolution of the encoder. Based on the marker pulse (or counting position pulses A and B), the preprocessor 150 can control when to supply the processed diagnostic data 154 to the combiner 130. For instance, data could be synchronized to some fraction of a revolution past the marker pulse or in another example, several revolutions past a given marker position. In another example of synchronization, the preprocessor 150 could monitor the encoder output signal 124 for a given frequency of pulses and submit data to the combiner 130 when the machine has achieved the given speed. Substantially any type of machine event can be monitored by the preprocessor 150 and utilized to synchronize the diagnostic sensor data 134 received from the sensor 140 to the respective event (e.g., acceleration event noted at 100 counts past marker, vibration event every 1000 marker pulses, and so forth).

The encoder module 190 also includes communications stage 170 to provide the combined signal 160 from the combiner 130 to a remote system 180 via cabling, demonstrated schematically at 172. For example, the communications stage 170 can include a transmitter 174 (e.g., one or more line drivers) that transmit signals for driving long distances via cabling 172, such as twisted pair conductors. As disclosed herein, the communications stage 170 can also include the receiver 176 to receive program instructions (PROG) for programming the encoder module, including the program data 192.

The remote system 180 can be a control system for the machine but other types of systems are possible, such as one or more dedicated computers or computer networks that are include software and/or hardware to monitor the diagnostic data and encoder data that is received. As disclosed herein, a decombiner can be implemented at the remote system 180 to separate the encoder output signal 124 from the processed diagnostic data 154. The terms combiner and decombiner (and variations thereof) refer to substantially any method for combining and separating, respectively, multiple data signals. For example, this can include multiplexing and demultiplexing, modulating and demodulating, mixing and filtering, for example. As one example, as mentioned above, the processed data 154 could be modulated by the combiner 130 as a high frequency component that rides on top of the lower frequency encoder output signal 124. That is, the encoder signal can operate as a carrier signal into which the processed diagnostic data is modulated. While the combiner 130 is demonstrated as separate from the communications stage 170, the combiner could be integrated with the communications stage to effect transmission of the combined signal to the remote system 180.

The sensor 140 (or sensors) can be installed in various locations and can include substantially any type of analog and/or digital sensors, such as disclosed herein. In some examples the sensor can be mounted at various points on (or near) the machine 120 with each sensor output providing diagnostic data 134 to the I/O port 144 (or ports). The sensor 140 can also include digital sensors such as over-speed sensors, blower sensors, filtration sensors, and so forth, which can vary depending on the purpose and application of the machine 120. In yet another example, the sensor 140 can be mounted within or near the encoder 110. In some cases, the housing of the encoder 110 or coupling between the encoder and the machine can function as a transducer for monitoring properties of the machine 120 (e.g., monitor the encoder housing for temperature, vibration of the motor, or machine bearing vibrations). In such cases, sensor output from the encoder 110 could be routed to the preprocessor 150 or sent directly to the combiner 130 to be combined with the encoder output data 124. In yet other examples of sensor implementation, some sensors 140 could be installed at the machine 120 while others could be installed at the encoder 110.

As demonstrated in FIG. 1, as one example, the encoder 110, combiner 130, preprocessor 150 and output stage could all be packaged as one encoder module 190. Various other configurations are possible. For instance, the preprocessor 150, combiner 130, and communications stage 170 could be packaged as an add-on module that is installed with existing encoder applications that are already installed with the respective machine 120. In yet another example, the encoder 110 and preprocessor 150 could be packaged in one module and the combiner 130 and communications stage 170 packed as part of a separate module. Various other packaging combinations for the encoder 110, combiner 130, preprocessor 150, and communications stage 170 are similarly possible. Similarly, the I/O port 144 could be part of a bulkhead connection where several sensor inputs are received at a single point or the I/O port could represent multiple ports positioned at various points on the encoder module 190.

It is noted that the examples described herein can be provided via different analog and/or digital circuit implementations. Some components can be employed as discrete implementations, such as a comparator comparing a reference signal to a sensor signal and in other examples, controllers operating via preprocessor instructions and exchanging data via D/A and A/D converters could be employed to monitor data and generate output signals. The encoder module 190 can employ various means of monitoring electrical parameters, such as monitoring voltage, resistance, capacitance, inductance and/or current. It can also employ a microcontroller or other control circuitry (e.g., a DSP) capable of digitizing these parameters, storing digital interpretations of these parameters in its memory, and associating acquired values with events in the module 190 operation. This can include performing logical and arithmetical operations with the acquired values of machine diagnostic information, for example. Additionally, since the machine diagnostic information is sent over already existing cabling (e.g., one or more twisted pair wires), no further running of expensive connections are required, which in many cases can run about 100 feet or more (e.g., oftentimes greater than 1000 feet and in some cases ½ mile or more).

In some cases, the system may self-monitor its own wiring and operating conditions. An example would be monitoring of the input voltage of the system 100. If an event was recorded where the input voltage dropped below a preset threshold, the preprocessor 150 could include this data or alarm as diagnostic information that is sent to combiner 130. In another example, the system could monitor the behavior of the outputs and the existing cabling systems connected to output state 170, including short circuits, impedance mismatches causing signal echoes, external noise superimposed on or interfering with the signals, or wires left open or unconnected. Again the preprocessor 150 could include this as diagnostic data sent to combiner 130. Alternatively or additionally, if it is determined that the existing communications link is unable to transmit the diagnostic data, the combiner 130 and/or output stage 170 can reconfigure dynamically to transmit the diagnostic data through one or more different wires determined to be more suitable for transmission. For example, the preprocessor 150 can analyze the quality of the existing primary communications path and/or the quality of one or more other available secondary paths, and selectively control which path (e.g., which wire or wires) to provide the combined signal based on such analysis. In some examples, information about errors in communication can be signaled from the remote system as feedback to the encoder module 190 for adjusting the path and/or the bandwidth being utilized for the combined signals. For instance, the preprocessor 150 can cause the communications stage to reroute the combined signal to another communications path if diagnostic information about the current path indicates another path (e.g., cable pair) would be more suitable for transmission of the combined signal to the remote station. Alternatively, preprocessor 150 could adjust sampling rates or combiner 130 could adjust diagnostic content to best adapt to cabling conditions.

Any or all of this diagnostic information could be transmitted to the remote system 180. For example, preprocessor 150 could modify the content of the combined signal, alarm, or data in response to determining that diagnostic information about the communications path indicates a reduction of potential bandwidth to transmit the combined signal.

The system 100 can also use individual or combined sensor data 134, internal or external, to correct and/or provide an alert about the encoder position or speed data itself. In one example, the encoder speed sensor 110 currently shows zero speed, but data from a vibration sensor indicates machine rotation. By example, an alarm can be generated by the preprocessor 150 based on the discrepancy between the vibration sensor data and the encoder data, which alarm can be transmitted to the remote system 180 and/or displayed locally. Such alarm thus can indicate a possible malfunction of the encoder speed system or disconnection from the machine shaft. In another example, the encoder 110 indicates rapid speed fluctuations due to deficiencies in the speed sensing system. Inputs from the other machine sensors 140 as well as pre-stored machine inertial characteristics can be correlated relative to the encoder speed information to generate an alarm that the speed fluctuations shown by the encoder may not accurately represent machine motion. Alternatively, the preprocessed additional machine sensor inputs can be used to correct or offset the encoder speed or position signals. This correction or alarming function can be included in encoder 110, preprocessor 150 or combiner 130.

Figure 2:
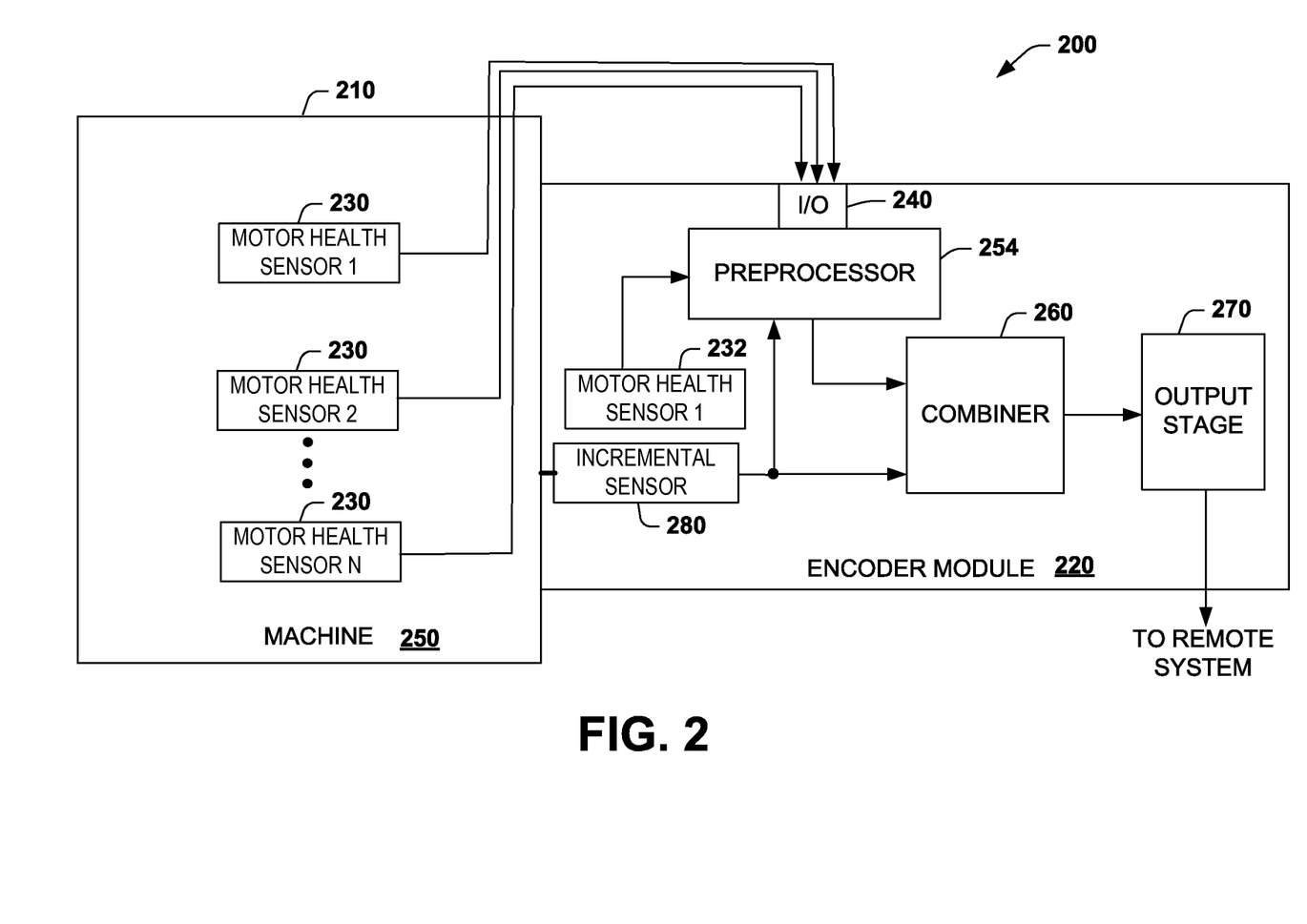
FIG. 2 illustrates an example of an installed machine and encoder system that combines machine diagnostic data with encoder data in a synchronized manner with the motion or position of the machine.

FIG. 2 illustrates an example of an installed machine and encoder system 200 that combines machine diagnostic data synchronized with the motion or position of the machine based on encoder data. A machine 210 is shown in an example configuration where an encoder module 220 is physically connected to the machine. The housing of the encoder module 220 may be attached to the machine 210 or may be separated by a mechanical coupling between the encoder module and the machine that physically links a shaft of the machine to a shaft on the encoder. As shown, the machine may have one or more sensors 230, shown as sensors 1-N, with N being a positive integer. The sensors 230 may be mounted in the machine 210, on the machine, or may be used to monitor environmental conditions outside the machine and thus are mounted separately spaced apart from the machine. One or more other sensors 232 can be mounted in or attached to the encoder module 220. Each of the sensors 230 and 232 can be configured to monitor or measure conditions related to health of the machine 250, such as disclosed herein, which measured conditions are different from motor position or speed that is monitored by the encoder sensor 280. As disclosed herein, machine sensor signals output from the sensors 230 can be received at an I/O port 240 (or ports) of the encoder module 220. Machine sensor signals from the sensor 232 can be either provided to the I/O port 240 via wired or wireless communication links or be provided to the preprocessor 254 via an internal bus.

As disclosed herein, the system 200 can be configured to report actual real-time diagnostic events or alarms. In some examples, the system can be configured to perform processing and/or comparative analysis or employ learning systems to implement predictive diagnostics based on trends or repeated events. The predictive diagnostics further can enable notification of local operators or remote station 180 that there is a likelihood (to a predetermined statistical probability) that an alert condition will occur before parameters exceed acceptable norms.

The encoder sensor 280 is configured to monitor machine motion and/or position. The encoder sensor 280 can be an incremental encoder or resolver, for example, which provides the encoder output signal representing rotational motion of a shaft of the machine 250 about an axis. The encoder sensor 280 may be configured using a variety of technologies such as optical (e.g., detecting light via one or more photodiodes), magnetic (e.g., detecting magnetic elements via Hall-effect or magnetoresistive sensors), conductive, inductive or capacitive technologies or the like. The encoder sensor 280 provides an electrical output indicative of position and/or speed of the machine (e.g., a rotary motor or generator) to which the encoder sensor is coupled.

A preprocessor 254 receives the diagnostic data the sensors 230 and 232 to perform analysis on the data in addition to synchronization of the data with the encoder 2. The preprocessor can be programmed to operate as described with respect to FIG. 1. Output from the encoder 280 and preprocessor is combined in a synchronous manner by a combiner 260 that provides a combined output signal to an output stage 270 for transmission to a remote system. As mentioned, various combinations are possible for the encoder module 220 where all or some of the components depicted in the module may exist inside and/or outside of the encoder module. In this example, one or more machine sensors 232 may also be mounted in the encoder module 220.

Outputs from the sensors 230 and 232 are sent to the preprocessor 254 for eventual combining with the encoder output signal by the combiner 260. The combiner 260 can provide aggregated encoder data and machine diagnostic data to an output stage 270. As disclosed with respect to FIG. 1, machine diagnostic data in the combined signal thus can be synchronized with machine position or motion as represented by the encoder signal from the encoder sensor 280.

Outputs from the sensors 230 and/or 232 and/or the output from the preprocessor 254 can also be used to correct the speed or position data created by the speed/position sensor 280. Alternatively or additionally, alarms can be generated by the preprocessor 254 and sent to the combiner 260 to inform local or remote users that the speed sensor 280 is malfunctioning or is operating marginally.

Figure 3:
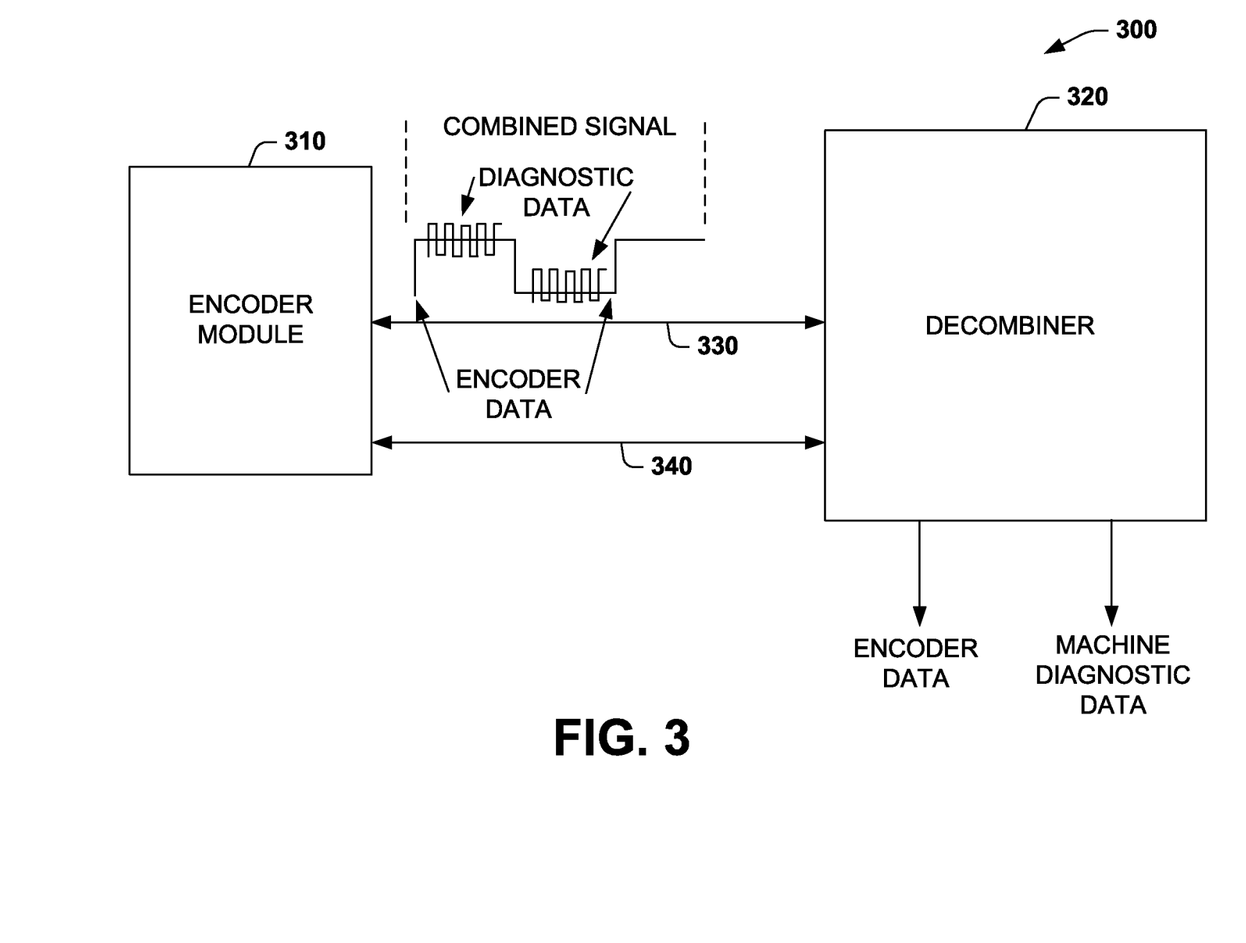
FIG. 3 illustrates an example of communication of combined encoder and diagnostic data between an encoder module and a decombiner.

FIG. 3 illustrates an example system 300 demonstrating transmission and receipt of a combined encoder and diagnostic signal generated by an encoder module (e.g., encoder module 190 of FIG. 1 or module 220 of FIG. 2). In the example of FIG. 3, the combined signal is communicated from encoder module (e.g., corresponding to module 190 or 220) to a decombiner 320 that is separated from the combiner at module 310 by a path that includes a length of wiring 330, such as about 100 feet or more (e.g., ½ mile or more). The encoder module 310 and decombiner can be located in the same building or in separate buildings.

The communications path 330 can include one or more segments of electrically conductive wiring (e.g., twisted pairs), wireless radios, repeater stations, optical fibers connected between fiber optic transceivers or other communication technologies. As one example, the path 330 includes a length of electrically conductive wiring, such as extending between the encoder module 310 and decombiner 320 a distance of about 100 feet or more (e.g., ½ mile or more). Depending on the environment through which the path travels and associate noise, the path can include multiple segments of one or more communications technology to help ensure signal integrity. The encoder module 310 and decombiner can be located in the same building or in separate buildings. The combined signal can include encoder data which represents lower frequency position data from the encoder.

In the example of FIG. 3, for illustrative purposes, a single wire is shown for the communications path 330 between the encoder module 310 and the remote station 320. However, one or more (e.g., 3 or more twisted pairs) electrically conductive cables or other types of communications paths (optical and/or wireless links) can be implemented as the path 330 to provide combined signals that carry both the encoder data (e.g., A, /A, B, /B, C, /C) and the machine diagnostic data. In some examples, only one of the six encoder signals communicated over one or a pair of wires has combined encoder and diagnostic data. In other examples more than one of the signals communicated over multiple wires or wire pairs can include the combined encoder data and the machine diagnostic data.

In some cases, such as in situations when the path 330 may not be traversed effectively via simple electrically conductive cables, the combined signal may be transmitted to the remote station 320 via a secondary (e.g., back-up communications path) 340. Like the path 330, the secondary path 340 can include one or more electrically conductive wires (e.g., twisted pairs), wireless radios, repeater stations, fiber optic transceivers or other communication technologies, which can completely or partially replace one, several, or all segments of the primary data communications path 330. In some examples, the secondary path 340 can include the same physical path 330, but represent that the communications technology used for communicating the combined signal over such path has been modified. For the example where the same physical path (e.g., an electrically conductive path of one or a pair of wires) is utilized for transmission of the combined signal, the type of modulation can be modified to another type of modulation that is more resistant to noise (e.g., by reducing the order of quadrature amplitude modulation (QAM)).

In the schematic example of FIG. 3, the combined signal can include diagnostic data superimposed on to the encoder data, such as where the diagnostic data represents a high frequency component modulated onto the encoder signal to provide the combined signal. In this example, the placement of the diagnostic data relative to the encoder data (e.g., the signal pluses) can provide the synchronization between encoder information and machine diagnostic information. The diagnostic data can be raw machine sensor data, preprocessed sensor data, diagnostic messages, alarm messages, maintenance messages, statistical data, health data indicating wear on the machine, and substantially any other type of data relating to the machine or the machine sensors (e.g., sensors 140 of FIG. 1; sensors 230 and 232 of FIG. 2). In some examples, the diagnostic data can also include diagnostic information about the encoder module, or the machine or encoder cabling, including cabling for data communications and/or power and/or encoder module. Output from the decombiner 320 provides the combined signal received from the encoder module 310 in its constituent parts shown as encoder data output and diagnostic data output which can subsequently be processed by a remote system (or systems). The function of the decombiner can be a reverse of the function implemented by the combiner at the encoder module 310 (e.g., a de-multiplexer, demodulator or the like).

Figure 4:
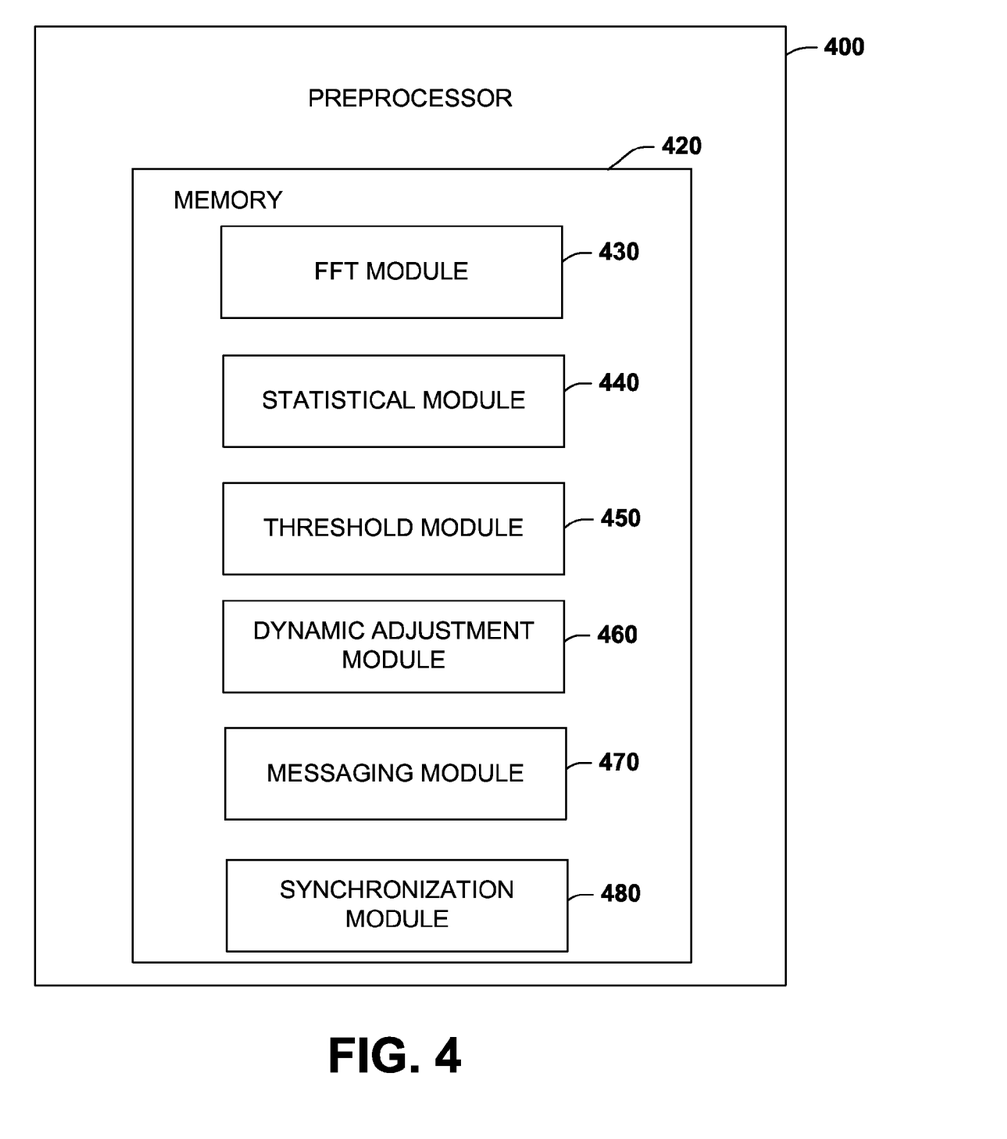
FIG. 4 illustrates an example of preprocessor for analyzing machine diagnostic data in combination with machine motion and/or position data.

FIG. 4 illustrates an example of preprocessor 400 that can be implemented for analyzing machine diagnostic data (e.g., corresponding to the preprocessor 150 of FIG. 1 or preprocessor 254 of FIG. 2). The preprocessor 400 can includes a memory 420 which includes various functional modules (e.g., code blocks) which can be executed as instructions by a processor core of the preprocessor. The memory can be implemented as a non-transitory machine readable medium, which can include volatile, non-volatile or a combination thereof. In one example, the preprocessor 400 could be a separate microprocessor from the memory 420. In another example, the preprocessor 400 could be a microcontroller where the memory 420 is embedded in the preprocessor. Although the modules described herein are discussed in terms of instructions stored in the memory 420, it is noted that the functions of one or more of the modules disclosed herein could be implemented as discrete electronics and/or circuits that provide processing resources to the preprocessor 400.

By way of example, one analysis module can be a Fast Fourier Transform (FFT) module 430. Such module can be employed to convert time domain signals captured from one or more sensors (e.g., sensors 140 of FIG. 1 or sensors 230 and 232 of FIG. 2) into corresponding frequency domain data for further analysis. For example, the preprocessor 400 can analyze such frequencies with respect to frequency profiles that may be stored in the memory 420 for a given sensor/motor combination and operation thereof. As another example, the respective frequencies (e.g., from accelerometers configured to measure machine acceleration of machine housing in one or more directions) can be analyzed with respect to predetermined thresholds such as analyzing whether or not a given frequency is within a low limit and high limit range for a given event transformed from the time domain. FFT can be integral within the preprocessor functionality and/or provided as part of a separate processing algorithm.

Another module that can be executed from the memory 420 includes a statistical module 440. This can include substantially any type of statistical processing that can be applied to the captured sensor data or to sensor data after being processed by one or more other analysis modules of the preprocessor. For example, the statistical module 440 can be programmed to determine average sensor values over time. As another example, the statistical module 440 can determine one or more statistical probabilities for diagnostic data sets and measuring sensor data within a predetermined threshold of a computed probability for a given reading and/or data set. As noted previously, classifiers can be employed that are trained to the normal operations of the machine. Such classifiers provide a predicted probability for each sensor input analyzed after sufficient training. Alternatively, the classifiers can provide a predicted probability for each sensor input analyzed via comparison with pre-determined manufacturer's component norms, published diagnostics characteristics of one or more components or based on baseline normal operating data obtained and stored in memory for the given machine. If trending from diagnostic readings start to drift over time, for instance if a classifier determines that a statistical threshold has been crossed, then warnings and/or alarms can be generated. The classifiers can also be trained to compute probabilities over a set of sensor data aggregated from multiple sensors, for example.

Another module in the memory 420 includes a threshold module 450. The threshold module 450 can be configured to store preset values (e.g., in response to a user input, such as stored in program data 192) to define one or more operating thresholds for a given sensor reading, a set of plural sensor readings, or thresholds for diagnostic processes that may be executed by the preprocessor 400 (e.g., threshold counter setting for how many times a noise event can occur before initiating a warning). The thresholds can be programmed in response to a user input and can vary depending on the configuration of the machine being monitored. The thresholds can represent voltages, currents, counter settings, FFT readings, digital values, analog values, statistical values, and so forth. Range settings can also be accommodated wherein high and low thresholds are set for a given value to define one or more ranges. In other examples, one or more sensors could be implemented as switches that activate when thresholds are met and the threshold module 450 (or other functions executed in the preprocessor 400) can monitor the switch output to operate in response to activation of such switch.

In another example, the memory 420 can include a dynamic adjustment module 460. The dynamic adjustment module 460 can be employed to alter how sensors are sampled and/or how system events or conditions of the machine are responded to. The adjustments can be made to the sensors or sample rate, for example, based on machine sensor signals (e.g., raw sensor signals and/or processed data). As an example, an intermittent high speed event may have to have its sampling rate for a given sensor adjusted to a higher speed in order to adequately capture information associated with the event. As another example, if an event is detected at a given sampling rate, the sampling rate can be increased to capture additional details about the event. A slower parameter, such as temperature, may be sampled at a lower rate as the temperature typically does not change in a rapid manner.

In another example, the dynamic adjustment module 460 can be programmed to modify sensing by associated machine sensors at specific positions or at certain speeds of machine motion. For instance, if a machine condition is detected to occur at a particular angular position, the sample rate can be increased for a range of angular positions centered about the position where the event is detected (e.g., based on analysis indicating a given sampled parameter from a sensor falls outside of a normal range). It is possible that such an event is an anomaly or only occurs infrequently or at one specific motor position. For instance, an accelerometer sensor reading may be captured and determined to correspond to out of range vibration at one specific point of machine travel. At such point (or points), dynamic adjustments can be made to sample the given point more or less frequently depending on the application. For example, it can be determined that the event occurs concurrently with the known addition or removal of a load or other condition which can occur at a given position over time. The dynamic adjustment module 460 thus can be programmed to dynamically adjust the threshold for a given parameter in response to determining the occurrence of a related event relative to the given specified location. Dynamic adjustments can be applied to sampling rates for sensor signals, processing rates of sensor data, digital filtering constants, threshold adjustments, statistical adjustments, FFT parameter adjustments, and so forth.

Yet another module that can be executed in the memory 420 includes a messaging module 470. The messaging module 470 can be configured to generate one or more messages to provide a notification that includes information about a detected event. In some examples, the message can be selected from a set of preprogrammed message codes stored in memory having a predefined meaning (e.g., threshold exceed for vibration sensor A). Also, dynamic information can be encoded in a given message that describes the detected event (e.g., it can describe parameter values for the detected event and threshold levels). The message can be provided locally at or near the encoder or machine. For example, local messages can be generated by turning on a light or LED indicating an operating condition of the machine, such as disclosed respect to FIG. 5. Additionally or alternatively, remote messages can be sent (e.g., by a combiner) as part of the diagnostic data that is combined with the encoder position data as disclosed herein.

The preprocessor 400 can also include a synchronization module 480. The synchronization module 480 is programmed for synchronizing received sensor data and/or processed sensor data with the position or speed of the encoder. Positions can be programmed to be synchronized with diagnostic data at any point within a given revolution of the encoder, such as based on the reference mark indicated in the encoder output signal. Synchronization of machine diagnostic data can also be implemented after a predetermined number of revolutions of the encoder and at some other point in the overall machine movement. The position or motion to which the diagnostic data is synchronized can be programmed in response to a user input or based on an event determined by another analysis module of the preprocessor 400, for example.

Figure 5:
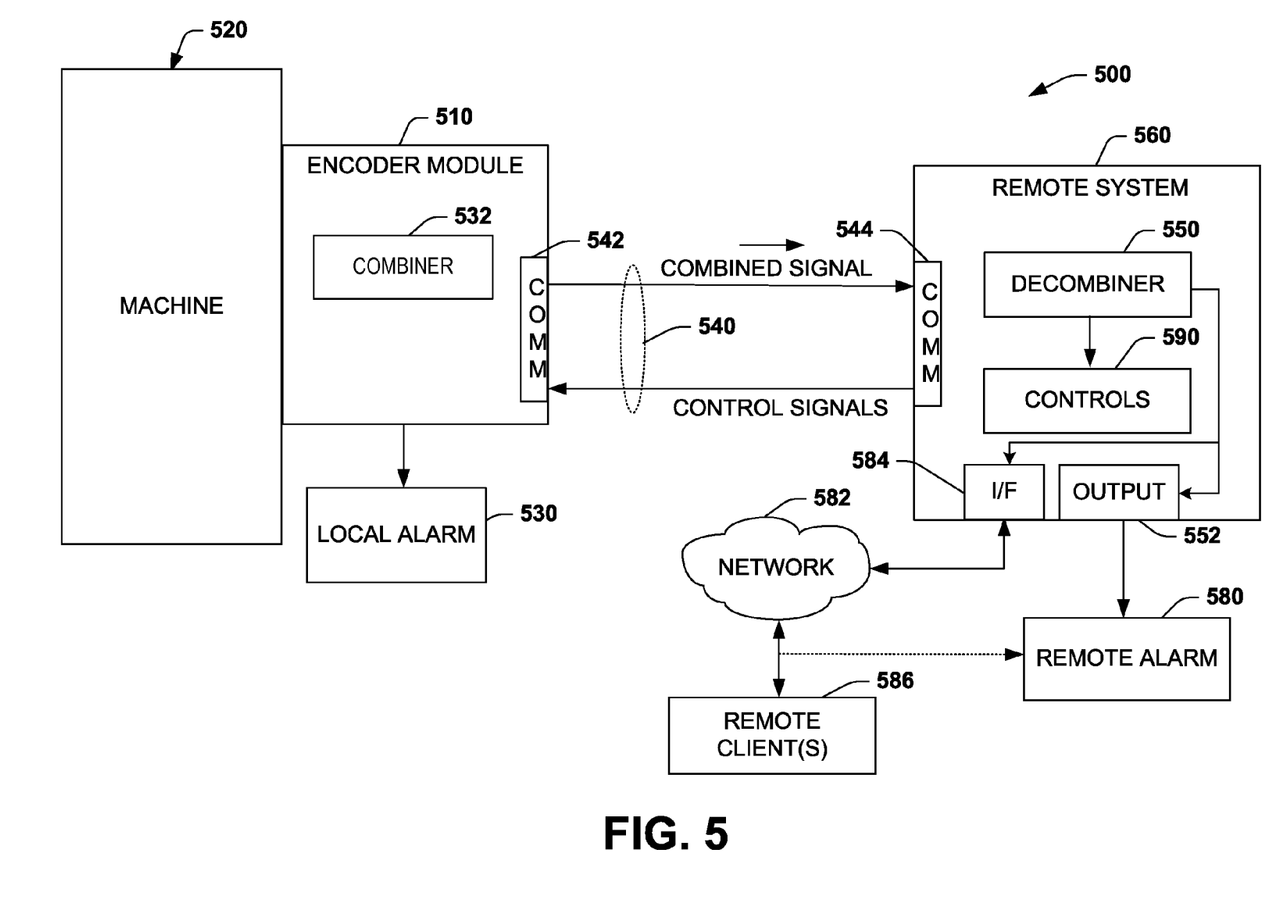
FIG. 5 illustrates a system for generating local and/or remote messages from an encoder module that processes machine diagnostic data.

FIG. 5 illustrates a system 500 for generating local and/or remote messages from an encoder module 510 that processes machine diagnostic data. In this example, an encoder module (e.g., corresponding to module 190 or 220) 510 monitors a machine via sensors (not shown, but see, e.g., sensors 140 of FIG. 1, sensors 230 and 232 of FIG. 2) mounted within a machine 520 and/or in the encoder module. If a sensor reading or preprocessor diagnostic is determined (e.g., by a preprocessor 254 of FIG. 1 or preprocessor 400 of FIG. 4) to be outside of a given threshold setting, in one example, the encoder module 510 can activate a local alarm 530. Such local alarm 530 could be implemented, for example, by changing the color of a light or an LED from one color to another (e.g., changing LED from green to yellow or red depending on nature of alarm) or from OFF to ON. Additionally or alternatively, the local alarm 530 could also include an audible message or a visual message (e.g., text and/or graphics) sent to a local display. In another example, the local alarm 530 may merely be color such as yellow indicating that routine maintenance should be performed on the machine at the next scheduled shutdown for the factory in which the machine operates.

In addition to generating local alarms 530, the encoder module 510 can send alarm data to trigger one or more remote alarms 580. For example, the encoder module can include a combiner 532 configured to combine the alarm message, corresponding to machine diagnostic data, with the encoder position/motion data, as disclosed herein. The combined data can be provided over a path 540 interconnecting the encoder module 510 and the remote system. The path 540 can extend a length that can exceed about 100 feet or 1000 feet, for example, and even up to ½ mile or more in other examples. The path 540 for instance can be implemented by one or more twisted pairs of shielded electrically conductive cabling communicatively coupled between communication circuitry 542 and 544. This path 540 may also consist of one or more wireless radio transceivers, fiber optic transceivers or other communication systems alone, or combined with one or more electrically conductive cabling segments. As mentioned, since the remote message and other machine diagnostic data is combined with the encoder data, no new additional wiring or transceiver system is required to provide the combined data over the path 540.

The remote messages can be extracted from the combined data signal via a decombiner 550 implemented at the remote system 560. The decombiner can provide the extracted remote message to an output module 552 that can generate a remote alarm 580. The remote alarm 580 can be generated as including an audible warning sound, a display update, or a warning light, for example. Additionally or alternatively, the extracted remote message can be provided to one or more remote clients 586 via a network 582, such as can include a local area network and/or a wide area network (e.g., the Internet). For example, the remote system 560 can include a network interface 584 that provides for communication between the remote system 560 and the network 582. As an example, an electronic message can provide an indication of the remote alarm being triggered along with additional diagnostic information to the remote user. The electronic message can be implemented using one or more messaging technologies, such as can include pager, instant messaging, text messaging, audio telephone message, and/or e-mail message. The remote client 586 can also be provided a graphical user interface (GUI) that the user can employ to access other features or controls 590 implemented by the remote system 560. For example, the GUI can provide a dashboard that displays current and/or historical diagnostic information associated with the machine 520 based on the diagnostic information provided in the combined signal. The GUI can also enable the user to access controls 590 configured to control operation of the machine 520 and/or of the encoder module 510. As an example, the client 586 can be programmed to control the encoder module 510 to adjust one or more sensors' operation or sample rate of the sensing signals, activate or deactivate one or more sensors. In another example, the user 586 can upload new or existing machine characteristics, such as rebuilt bearing profile and associated frequency data. In other examples, the remote client 586 can control operation of the motor, such as by adjusting motor control signals. Such motor and encoder controls can be provided to the encoder module as control data via the same communications path 540.

The controls 590 can also be configured to provide motor and/or speed control signals via the path 540 in an automated manner based on the encoder data extracted from the combined signal by the decombiner. The controls 590 can also be configured to provide encoder control instructions over the path 540 for programming and controlling operation of the encoder module 510.

Figure 6:
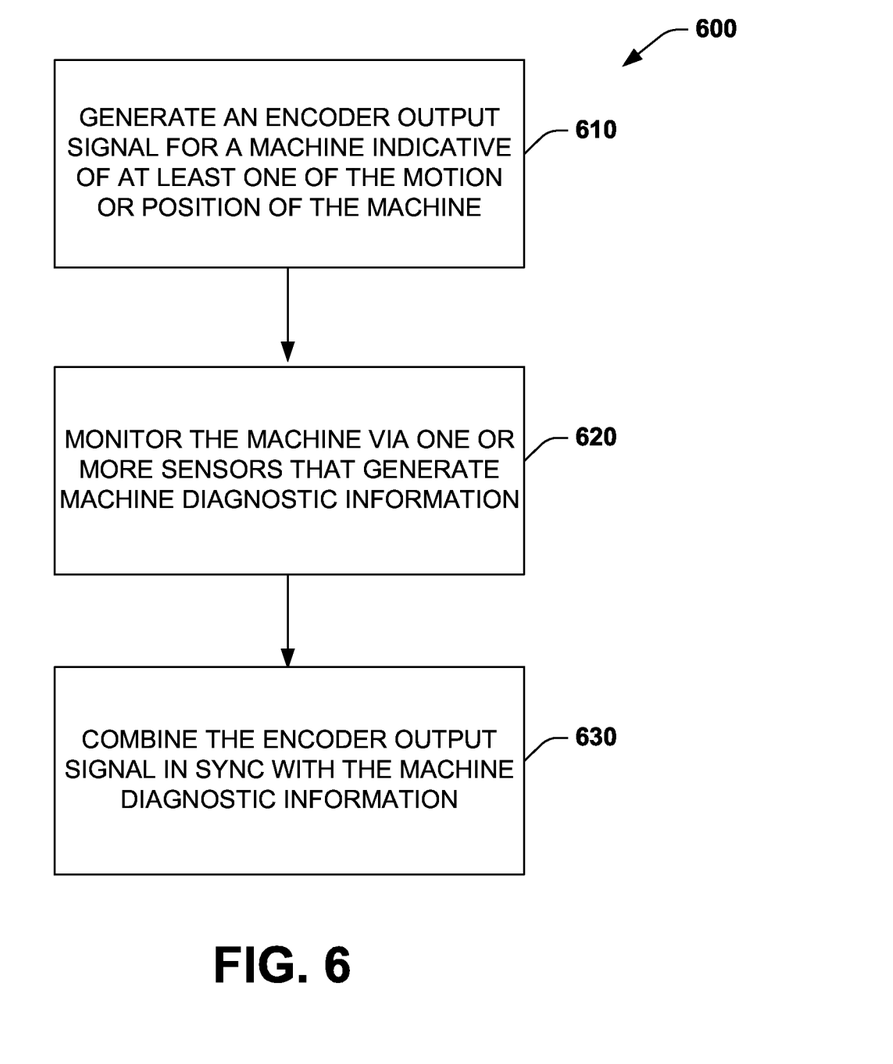
FIG. 6 illustrates an example of a method for providing machine diagnostic data synchronized with encoder information.

In view of the foregoing structural and functional features described above, a methodology in accordance with various aspects of the disclosure will be better appreciated with reference to FIG. 6. While, for purposes of simplicity of explanation, the methodology of FIG. 6 is shown and described as executing serially, it is to be understood and appreciated that the method is not limited by the illustrated order, as some aspects could, in accordance with the disclosure, occur in different orders and/or concurrently with other aspects from that shown and described herein. Moreover, not all illustrated features may be required to implement a methodology as described herein.

FIG. 6 illustrates an example of a method 600 for combining machine diagnostic data with encoder data in a manner synchronized with the motion or position of the machine. The method can be implemented in any of the example systems disclosed herein (e.g., FIGS. 1-5). At 610, the method 600 includes generating (e.g., via encoder 110 of FIG. 1 or encoder sensor 280 of FIG. 2) an encoder output signal for a machine (e.g., a rotary motor) indicative of at least one of the motion or position of the machine. At 620, the method 600 includes monitoring the machine via one or more sensors (e.g., sensors 140 of FIG. 1, sensors 230 and/or 280 of FIG. 2). Such sensors generate machine diagnostic data such as can be provided via analog or digital signals. At 630, the method 600 includes combining (e.g., via combiner 130 of FIG. 1 or combiner 260 of FIG. 2) the encoder output signal with the machine diagnostic data received from at least one of the sensors on to a combined output signal machine diagnostic data synchronized with at least one of the motion or the position of the machine. The machine diagnostic data can be processed data (e.g., via preprocessor 150 of FIG. 1 or preprocessor 254 of FIG. 2), such as can include signal processing and/or analysis as disclosed herein. The method 600 can include additional features disclosed herein. The combined signal can be communicated to a remote site via a communications path (e.g., the path 330 or 340 of FIG. 3).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   an encoder that monitors a machine and generates an encoder output signal indicative of at least one of motion or position of the machine;
   a combiner that receives the encoder output signal from the encoder and receives machine diagnostic data based on sensor data from at least one sensor, the combiner modulating the machine diagnostic data onto the encoder output signal to provide a combined signal that includes the machine diagnostic data synchronized with the at least one of the motion or position of the machine; and
   a communications stage that transmits the combined signal to a remote system over an existing communications path between the encoder and the remote system.

2. The system of claim 1, further comprising a preprocessor to analyze the sensor data and generate processed diagnostic data based on the analysis of the sensor data from the at least one sensor, the processed diagnostic data being synchronized with the at least one of the motion or position of the machine in the combined signal.

3. The system of claim 2, wherein the preprocessor is to analyze the machine diagnostic data with respect to at least one diagnostic threshold and generate a message if the at least one diagnostic threshold is exceeded.

4. The system of claim 3, wherein the message is provided as one of a local alarm at or near the encoder or a remote alarm that is combined with the encoder output signal in the combined signal and transmitted to a remote system.

5. The system of claim 2, wherein the preprocessor is configured to perform a Fast Fourier Transform (FFT) to convert time domain sensor data, corresponding to the sensor data from the at least one sensor, to frequency domain data that is combined by the combiner with the encoder output signal and provided to a remote system synchronized with the encoder output signal.

6. The system of claim 5, wherein the preprocessor is configured to analyze the frequency domain data with respect to a threshold and to provide the processed diagnostic data in the combined signal based on the analysis.

7. The system of claim 5, wherein the preprocessor further comprises a dynamic adjuster that adjusts a sampling rate for the at least one sensor based on the frequency domain data determined by the FFT.

8. The system of claim 2, wherein the preprocessor further comprises a dynamic adjuster that modifies an operating parameter for the at least one sensor based on analysis of the sensor data from at least one machine sensor.

9. The system of claim 2, wherein the preprocessor further comprises a dynamic adjuster that modifies an operating parameter for the at least one sensor based on the position or speed of the machine.

10. The system of claim 2, wherein the preprocessor further comprises a dynamic adjuster that adjusts a machine diagnostic threshold that is applied to the processed to detect a predetermined machine event.

11. The system of claim 10, wherein the dynamic adjuster is that modifies the machine diagnostic threshold utilized by the preprocessor to analyze the sensor data for the at least one sensor based on at least one of analysis of sensor data from at least one other machine sensor or the position or speed of the machine indicated by the encoder output signal.

12. The system of claim 1, wherein the existing communications path includes a primary communications path for communicating the encoder output signal to the remote station,
wherein machine diagnostic data includes diagnostic information about the primary path, the combined signal being transmitted to the remote station through another communications path if the diagnostic information about the primary path indicates that the quality for the primary communications path is below a quality threshold.

13. A method comprising:
generating an encoder output signal for a machine indicative of at least one of the motion or position of the machine;
monitoring the machine via one or more sensor signals and generating machine diagnostic data representing a characteristic of the machine;
modulating the machine diagnostic data onto the encoder output signal to provide a combined signal in which the machine diagnostic data is synchronized with at least one of the motion or the position of the machine; and
transmitting the combined signal to a remote system over an existing communications path between an encoder that generates the encoder output signal and the remote system.

14. The method of claim 13, further comprising processing the machine to generate processed diagnostic data, the processed diagnostic data being combined with the encoder output signal in the combined signal.

15. The method of claim 14, further comprising synchronizing capture of the machine diagnostic data relative to a frequency of at least one pulse on the encoder output signal to generate the processed diagnostic data that is synchronized with the motion of the machine.

16. The method of claim 13, wherein processing the machine diagnostic data further comprises:
analyzing the processed diagnostic data with respect to at least one diagnostic threshold; and
generating a message if the at least one diagnostic threshold is exceeded.

17. The method of claim 14, wherein the preprocessing further comprises:
executing a Fast Fourier Transform (FFT) to convert time domain data, corresponding to a given signal of the one or more sensor signals, to frequency domain sensor data;
analyzing the frequency domain sensor data with respect to the at least one diagnostic threshold to provide the processed diagnostic data characterizing health of the machine.

18. The method of claim 13, further comprising:
analyzing a quality of the communications path; and
controlling the transmission of the combined signal based on the analyzing.

19. An encoder apparatus comprising:
an encoder to generate an encoder output signal indicative of at least one of motion or position of a rotary machine;
a preprocessor to analyze at least one sensor signal indicative of a condition of the rotary machine and to provide motor diagnostic data based on the analysis;
a combiner to modulate the motor diagnostic data onto the encoder output signal the encoder output signal motor to provide a combined signal in which the motor diagnostic data is synchronized with the at least one of the motion or position of the rotary motor indicated by the encoder output signal; and
a communications stage to provide the combined signal to a remote system.

* * * * *

UNITED STATES PATENT AND TRADEMARK OFFICE
CERTIFICATE OF CORRECTION

PATENT NO.        : 9,927,265 B2                                          Page 1 of 1
APPLICATION NO.   : 14/520933
DATED             : March 27, 2018
INVENTOR(S)       : William P. Niro et al.

It is certified that error appears in the above-identified patent and that said Letters Patent is hereby corrected as shown below:

In the Claims

Column 18, Line 42 reads "the encoder output signal the encoder output signal motor" should read --the encoder output signal motor--

Signed and Sealed this
Twenty-ninth Day of May, 2018

Andrei Iancu
*Director of the United States Patent and Trademark Office*